(12) United States Patent
Chen et al.

(10) Patent No.: US 8,379,535 B2
(45) Date of Patent: Feb. 19, 2013

(54) OPTIMIZATION OF STREAMING DATA THROUGHPUT IN UNRELIABLE NETWORKS

(75) Inventors: Minghua Chen, Albany, CA (US); Avideh Zakhor, Berkeley, CA (US)

(73) Assignee: Videopression LLC, Wilmington, DE (US)

( * ) Notice: Subject to any disclaimer, the term of this patent is extended or adjusted under 35 U.S.C. 154(b) by 359 days.

(21) Appl. No.: 12/881,089

(22) Filed: Sep. 13, 2010

(65) Prior Publication Data
US 2011/0002236 A1    Jan. 6, 2011

Related U.S. Application Data

(62) Division of application No. 11/147,788, filed on Jun. 7, 2005, now Pat. No. 7,796,517.

(60) Provisional application No. 60/583,926, filed on Jun. 28, 2004.

(51) Int. Cl.
*H04L 12/26* (2006.01)
(52) U.S. Cl. ........ 370/252; 370/230; 370/235; 370/333; 370/395.2; 370/395.4; 370/468; 370/477; 709/224; 709/225; 709/228; 709/229; 709/232
(58) Field of Classification Search ....... 370/230–238.1, 370/252, 253, 333, 395.2, 395.21, 395.4, 370/395.41, 468, 477; 709/223–235
See application file for complete search history.

(56) References Cited

U.S. PATENT DOCUMENTS

| | | | |
|---|---|---|---|
| 6,144,635 A | | 11/2000 | Nakagawa |
| 6,993,013 B1 * | | 1/2006 | Boyd ............................ 370/352 |
| 6,993,591 B1 | | 1/2006 | Klemm |
| 7,088,677 B1 | | 8/2006 | Burst |
| 2002/0010866 A1 | | 1/2002 | McCullough et al. |
| 2002/0150048 A1 | | 10/2002 | Ha et al. |
| 2003/0041146 A1 | | 2/2003 | Davis et al. |
| 2003/0058792 A1 | | 3/2003 | Shao et al. |
| 2003/0067877 A1 | | 4/2003 | Sivakumar et al. |
| 2003/0198184 A1 | | 10/2003 | Huang et al. |
| 2003/0214908 A1 | | 11/2003 | Kumar et al. |
| 2004/0001493 A1 * | | 1/2004 | Cloonan et al. .......... 370/395.42 |
| 2005/0005020 A1 | | 1/2005 | Rey et al. |
| 2005/0239491 A1 * | | 10/2005 | Feder et al. .................... 455/522 |
| 2005/0249157 A1 * | | 11/2005 | Qian et al. .................... 370/329 |

FOREIGN PATENT DOCUMENTS

EP           1175034         1/2002

OTHER PUBLICATIONS

Handley et al.; RFC 3448—TCP Friendly Rate Control (TRFC) Protocol Specification, Jan. 2003, IETF.
Stolowitz Ford Cowger LLP; Related Case Listing; Sep. 13, 2010; 1 Page.

* cited by examiner

*Primary Examiner* — Hoon J Chung
(74) *Attorney, Agent, or Firm* — Stolowitz Ford Cowger LLP (57) ABSTRACT

Multiple TRFC connections transport streaming data through a wireless channel, and the difference between measured round trip times of packets and minimum round trip time is used to adjust the number of TFRC connections to fully utilize bandwidth through the wireless channel.

26 Claims, 7 Drawing Sheets

OPTIMIZATION OF STREAMING DATA THROUGHPUT IN UNRELIABLE NETWORKS

CROSS-REFERENCE TO RELATED APPLICATIONS

This application is a division of and claims priority to U.S. patent application Ser. No. 11/147,788, filed Jun. 7, 2005, issued as U.S. Pat. No. 7,796,517, by Chen et al. and entitled "Optimization Of Streaming Data Throughput In Unreliable Networks," which claims priority under 35 U.S.C. §119 of U.S. Provisional Application Ser. No. 60/583,926, filed Jun. 28, 2004, by Chen et al. and entitled "System for Streaming Digital Content Over Lossy Physical Link Using Multiple TFRC Connections," all of which are incorporated herein by reference in their entirety.

ACKNOWLEDGMENT OF GOVERNMENT SUPPORT

The technology described herein was funded by grants from the Department of the Air Force Contract Number F49620-00-1-0327 and the National Science Foundation Contract No. ANI-9905799. The Government has certain rights to this technology.

FIELD OF THE INVENTION

This invention relates to the field of network throughput optimization and, more specifically, to increasing throughput of bandwidth-intensive applications such as streaming video.

BACKGROUND

Rate control is an important issue in both wired and wireless streaming applications. A widely popular rate control scheme over wired networks is equation based rate control, also known as TCP Friendly Rate Control (TFRC). There are basically three advantages for rate control using TFRC: First, TFRC does not cause network instability, thus avoiding congestion collapse. Second, TFRC is fair to TCP (Transmission Control Protocol) flows, which is currently the dominant source of traffic on the Internet. Third, the rate fluctuation of TFRC is lower than TCP, making TFRC more appropriate for streaming applications that require constant video quality. For streaming over wireless channels where packets can be corrupted by wireless channel errors at the physical layer, rate control is a challenging problem.

Neither TFRC nor TCP are designed to distinguish between packet loss due to buffer overflow—i.e., network congestion—and packet loss due to bit errors, namely, errors in the physical transmission of data. Transmission at the physical layer in wired channels is much more reliable than transmission at the physical layer in wireless channels. Obstacles, signal interference, and other environmental factors more readily affect wireless channels than wired channels. Both TCP and TFRC have been designed to deal with buffer overflow in wired networks and, accordingly, assume that any packet loss is due to congestion rather than failure at the physical layer. Packet loss due to congestion suggests that transmission data rate should be reduced to avoid such congestion. To avoid network collapse due to congestion, TCP aggressively reduces data rate in response to packet loss. However, packet loss can occur in wireless channels that are not congested due to network errors. Reducing transmission data rates in such circumstances can result in under-utilization of the available bandwidth and therefore to artificially low data rates and unnecessarily poor performance. This is especially true in protocols which respond rather aggressively to packet loss, as does TCP, when used in networks with fairly common packet loss due to network errors at the physical layer.

There have been a number of efforts to improve the performance of TCP over wireless channels. Such methods either hide end-hosts from packet loss caused by wireless channel error, or provide end-hosts the ability to distinguish between packet loss caused by congestion and that caused by wireless channel error. The disadvantages of these schemes are that they require modifications to network infrastructure or protocols. Modifications to network infrastructure require widespread adoption and implementation in the vast number of nodes of the Internet, i.e., computers participating in the routing of information through the Internet. Modifications to end-to-end protocols, such as TCP, requires modification of the operating systems of end host computer, a similarly arduous task.

In addition to attempts to improve performance of TCP over wireless channels, attempted solutions for improving rate control for streaming data over wireless channels include hiding packet loss caused by wireless channel error from end-hosts or providing end-hosts with the ability to distinguish between packet loss caused by congestion and packet loss due to wireless channel error.

In one end-to-end based approach to facilitate streaming over wireless, packet inter-arrival times and relative one way delay are combined to differentiate between packet loss caused by congestion and that due to wireless channel errors. There are two key observations behind this approach. First, relative one way delay increases monotonically if there is congestion. Second, inter-arrival time is expected to increase if there is packet loss caused by wireless channel errors. Therefore, examining these two statistics can help differentiate between congestion and wireless errors. However, high wireless error misclassification rates may result in under-utilizing the wireless bandwidth. In addition, this approach requires modifications to congestion control mechanism in protocol, again requiring modification to the vast number of nodes which route data through the Internet.

What is needed is an end-to-end approach that does not require any modifications to network infrastructure and protocols, except at the application layer. Changes to the application layer are relatively easy, often requiring no more than the downloading and installation of new client software, such as a modified streaming server or a modified streaming video player, without any modification to the underlying operating system or any of the intermediate nodes through which the streaming video signal might travel. The approach should ensure full utilization of bandwidth through wireless channels despite packet loss due to physical errors in the wireless channels.

SUMMARY OF THE INVENTION

In accordance with the present invention, a data stream is periodically modified and tested for performance degradation to determine whether full utilization of the available bandwidth has been achieved. The data stream is modified to increase its data rate. If performance degrades below a permissible threshold, such indicates that the available bandwidth to the receiving device has been exceed and the data rate of the data stream is decreased to bring the data rate within the available bandwidth. This periodic testing of the utilization enables learning of the available bandwidth and its utilization without requiring modification of the nodes and/or protocol by which the data stream is transported to the receiving device.

The data stream includes one or more TFRC connections. To increase the data rate, an additional TFRC connection is opened between the sending device and the receiving device. To decrease the data rate, e.g., in response to impermissible degradation of performance, a connection between the sending device and the receiving device is closed. Alternatively, the data rate can be increased or decreased by increasing or decreasing, respectively, the packet size of a single TFRC connection.

The observed performance of the data stream is a round trip time, i.e., an amount of time elapsing between the sending of a packet and receipt of a return packet corresponding to the sent packet. To avoid unnecessary rate variation due to noisy round trip time measurement, the observed performance is averaged over time. The expected, optimum performance is represented by a minimum round trip time, i.e., the amount of time that would elapse for the same packet round trip in the absence of network congestion. This minimum round trip time can be the lowest single observed round trip time.

The threshold representing the maximum permissible difference between the observed average round trip time and the minimum round trip time is proportional to the minimum round trip time, e.g., 20% thereof.

Round trip times are affected by network congestion but not by loss of packets due to network errors at the physical layer. Accordingly, measurements of this metric are able to determine whether network congestion is due to the data rate of the data stream exceeding available bandwidth to the receiving device, regardless of packet losses due to network errors, e.g., in a wireless network in which errors are fairly likely.

Alternatively, the observed performance can be an observed packet loss rate, and the expected, optimum performance can be a minimum permissible packet loss rate. Packet loss due to wireless network errors are assumed to be random and stationary. Accordingly, over time, the packet loss rate observed for the data stream should be fairly stable and consistent. If the data rate of the data stream is increased beyond the available bandwidth through the wireless network to the receiving device, an increase in that packet loss rate is expected. Detecting such a packet loss rate increase beyond the expected packet loss rate by at least a threshold permissible amount indicates that the data rate of the data stream exceeds the available bandwidth to the receiving device and is therefore reduced.

The result is that full utilization of the available bandwidth through a wireless network to a receiving device can be detected and maintained by the sending device despite network errors in the wireless network and without modification of underlying network infrastructure. The result is significantly improved throughput from the sending device to the receiving device my modifications solely at the application layer.

DETAILED DESCRIPTION

In accordance with the present invention, the data rate of one or more TRFC connections transporting streaming data through a wireless channel is increased, and changes in performance of the TFRC connections is evaluated to detect full utilization of the available bandwidth of the connections. In particular, the data rate increases until performance decreases so much as to indicate network congestion and not intermittent packet losses due to network errors. Once network congestion is detected, the data rate is decreased to avoid exceeding the available bandwidth. The result is that the data rate converges at about the total available bandwidth of the one or more connections without exceeding the available bandwidth for particularly long periods of time.

In one embodiment, the data rate of the one or more TFRC connections is adjusted by adjusting the number of TFRC connections, and the difference between measured round trip times of packets and minimum round trip time is used to adjust the number of TFRC connections to fully utilize bandwidth through the wireless channel. Packet loss is not a reliable indicator of full bandwidth utilization when the physical layer is relatively unreliable and results in the loss of a significant number of packets. Instead, a substantial increase in round trip time for a data packet is a more reliable indicator of network congestion, and therefore full utilization of available bandwidth.

In a manner described more completely below, a connections counter is increased inversely to periodically increase the actual number of TFRC connections used. When the measured round trip time, accumulated and averaged over time, exceeds the minimum round trip time by a predetermined threshold amount, it is determined that the network path is congested and the connections counter and the actual number of TFRC connections are accordingly reduced. In effect, greater and greater numbers of connections between a host computer 106 (FIG. 1) sending streaming data to a client device 110 are tried until round trip time of packets sent from host computer 106 to client device 110 and back again is adversely affected. The threshold is selected so as to not be triggered by the occasional lost packet due to network errors but instead by a significant delay in packet delivery over time due to network congestion. Such ensures full utilization of available bandwidth between host computer 106 and client device 110.

Figure 1:
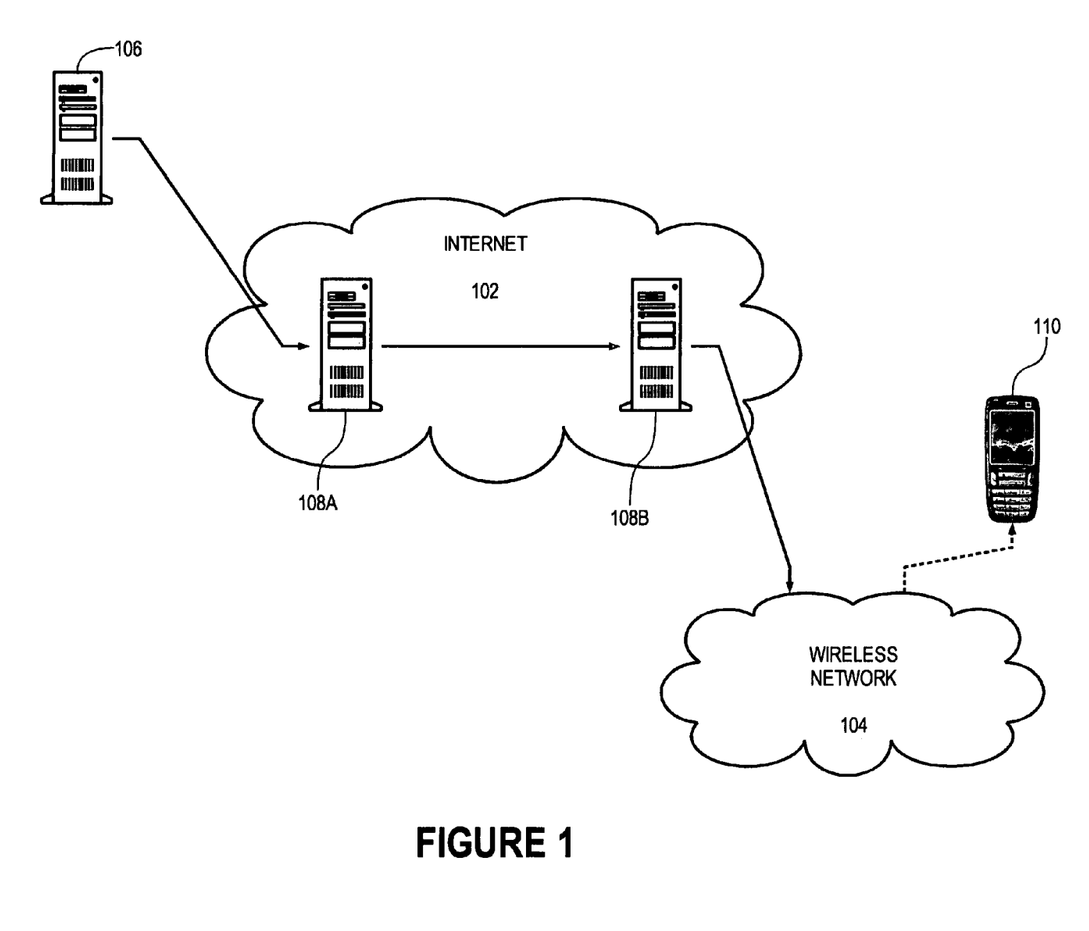
FIG. 1 is a block diagram of a host computer that sends a data stream to a receiving device through the Internet and a wireless network in accordance with the present invention.

FIG. 1 shows a view of the environment in which a stream of data is controlled in accordance with the present invention. Host computer 106 is coupled to, and serves, a wide area network 102, which is the Internet in this illustrative embodiment. Internet 102 includes a number of nodes 108A-B which route data through Internet 102 from a source, such as host computer 106, to a destination, namely, another computer or device capable of receiving data through Internet 102. Nodes 108A-B are computers configured to serve as nodes of Internet 102. Nodes 108A-B can also be special-purpose computers and/or appliances specifically configured to route data through a network. Of course, Internet 102 can and does have many more nodes than the two shown in FIG. 1.

In this illustrative example, host computer 106 sends a data stream to receiver device 110, which is a multimedia-capable mobile telephone. Accordingly, the data stream from host computer 106 travels through a wireless network 104, which is a cellular telephone network in this illustrative example. A connector from wireless network 104 to client device 110 is shown as a broken line in FIG. 1 to represent a wireless connection. Node 108B serves as a gateway in allowing communication of data between Internet 102 and wireless network 104.

FIG. 1 is greatly simplified for clarity of illustration. Internet 102 can and does have many more nodes than the two shown in FIG. 1. In addition, host computers coupled to Internet 102, like host computer 106, can and do number in the millions, as do client devices like client device 110. It should be appreciated that (i) host computer systems and client devices coupled to the Internet collectively number in the millions of computer systems and (ii) host computer systems can retrieve information like a client device, and client devices can host information like a host computer system. In addition, Internet 102 can be in communication with many networks other than wireless network 104.

Figure 2:
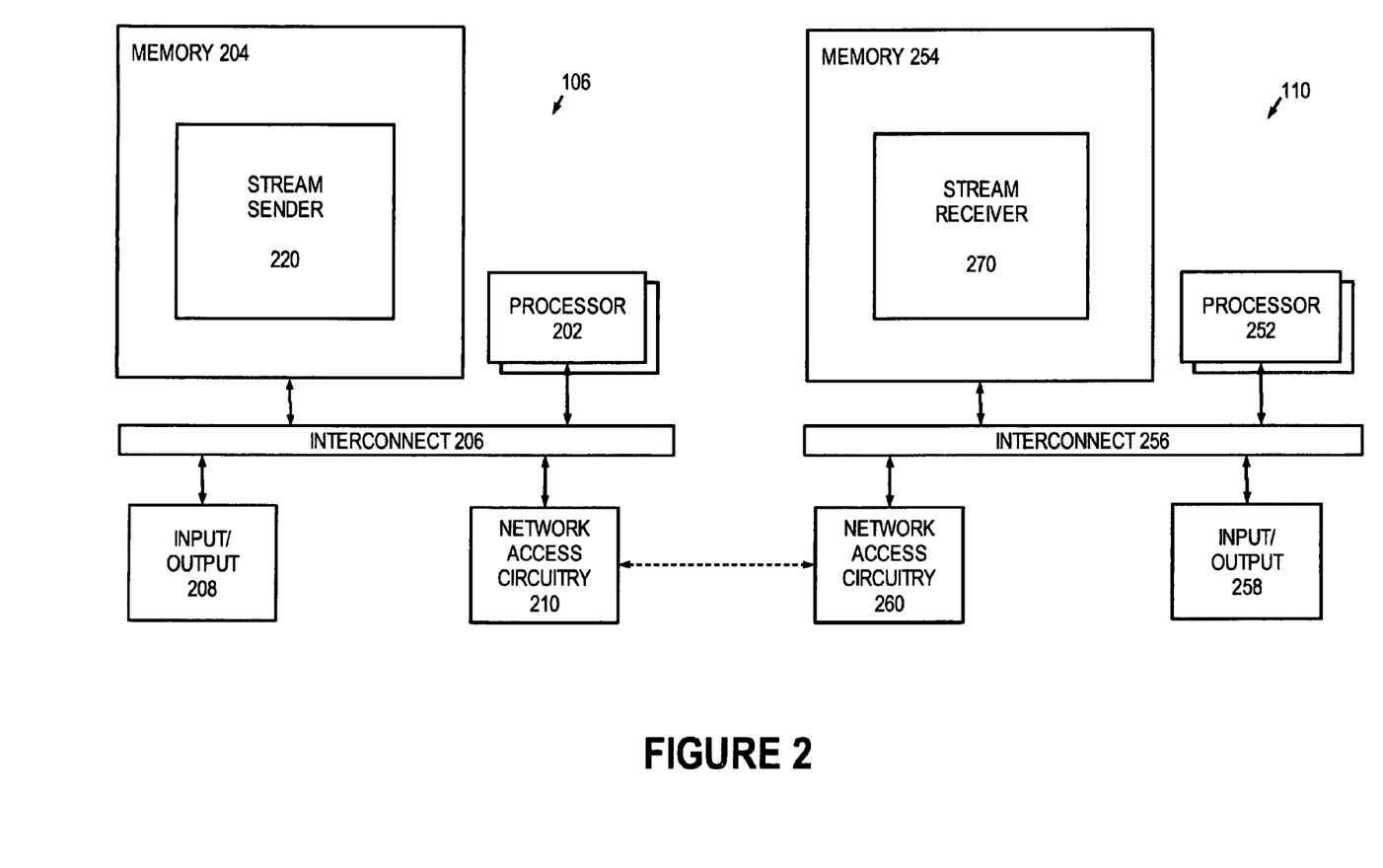
FIG. 2 is a block diagram of the host computer and the receiving computer of FIG. 1 in greater detail.

Some elements of host computer 106 and client device 110 are shown in diagrammatic form in FIG. 2. Host computer 106 includes one or more microprocessors 202 that retrieve data and/or instructions from memory 204 and executes retrieved instructions in a conventional manner. Memory 204 can include persistent memory such as magnetic and/or optical disks, ROM, and PROM and volatile memory such as RAM.

Microprocessors 202 and memory 204 are connected to one another through an interconnect 206 which is a bus in this illustrative embodiment. Interconnect 206 is also connected to one or more input and/or output devices 208 and network access circuitry 210. Input/output devices 208 can include, for example, a keyboard, a keypad, a touch-sensitive screen, a mouse, a microphone as input devices and can include a display—such as a liquid crystal display (LCD)—and one or more loudspeakers. Network access circuitry 210 sends and receives data through a network communications channel. In this illustrative embodiment, network access circuit 210 is Ethernet circuitry.

Client device 110 is generally analogous to host computer 106. Microprocessors 252, memory 254, interconnect 256, input/output devices 258, and network access circuitry 260 are analogous to microprocessors 202, memory 204, interconnect 206, input/output devices 208, and network access circuitry 210, respectively. Host computer 106 has less need for input/output devices 208 and, in fact, can be "headless" in that all user interaction is effected through network access circuitry 210 from a remotely located computer. On the other hand, client device 110 is much more likely to require direct user interaction and therefore require input/output devices 258. In addition, since client device 110 is a wireless device in this illustrative example, network access circuitry 260 includes a transceiver and an antenna for conducting data and/or voice communication through wireless network 104. Network access circuitry 210 and network access circuitry 260 are shown in FIG. 2 as connected by a broken line to illustrate communication between network access circuitry 210 and 260 through Internet 102 (FIG. 1) and wireless network 104.

Host computer 106 includes a stream sender 220 (FIG. 2), which is part or all of one or more computer processes executing in processors 202 from memory 204. Client device 110 includes a stream receiver 270, which is part or all of one or more computer processes executing in processors 252 from memory 254. Stream sender 220 and stream receiver 270 cooperate to send a stream of data, e.g., a digital video signal in this illustrative example, from stream sender 220 to stream receiver 270. In fact, it should be noted that the solution described herein requires no modification whatsoever to nodes 108A-B or to either operating system of host computer 106 and receiving device 110 and can be implemented entirely within the application layer. To actually modify current technology in the manner described herein requires no more than the modification of a streaming application on host computer 106 and a streaming video player on receiving device 110. Thus, a single entity providing stream sender 220 and stream receiver 270 can implement the system described herein without requiring the cooperation of the vast number of entities controlling the various nodes of Internet 102 and wireless network 104 through which the subject stream might travel.

Figure 3:
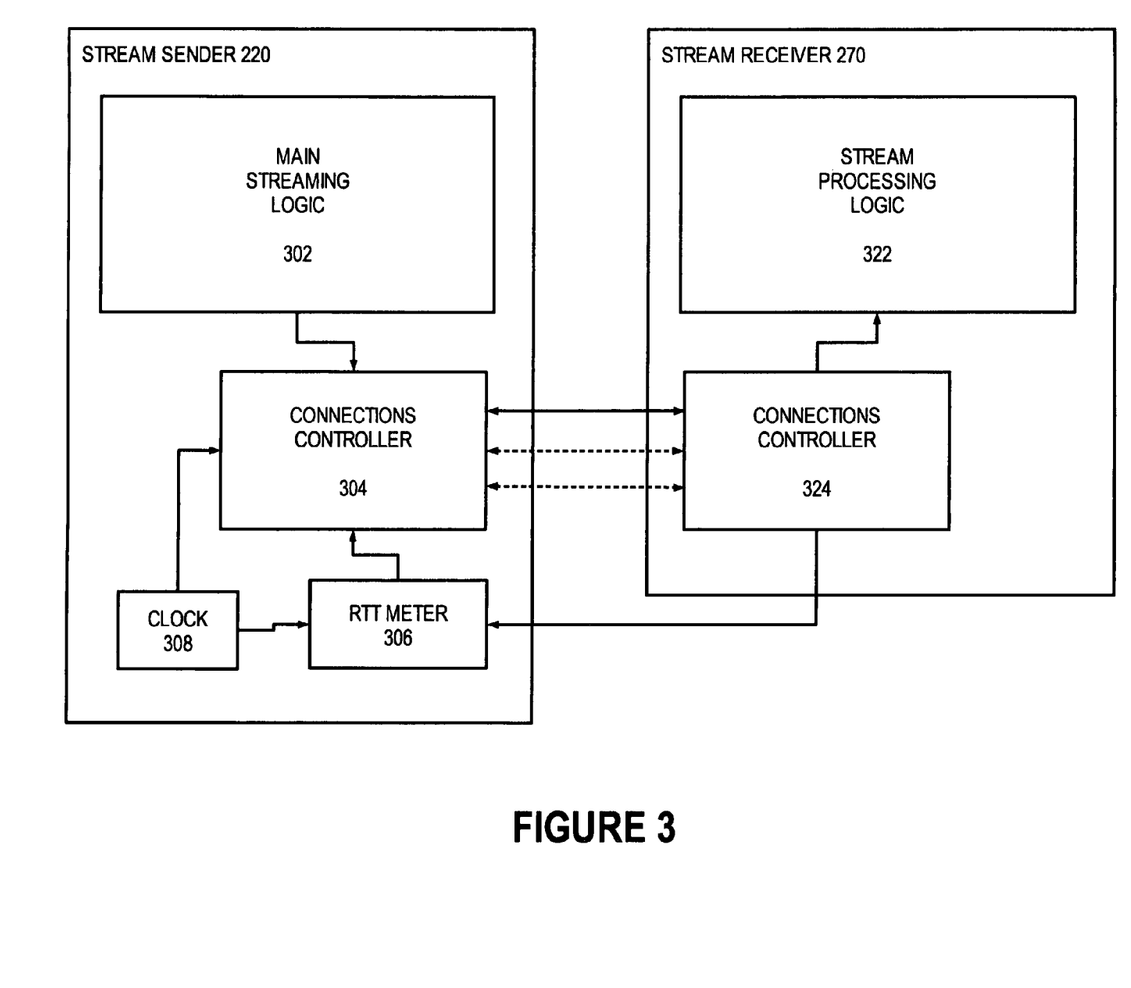
FIG. 3 is a block diagram of a stream sender of the host computer and a stream receiver of the receiving device of FIG. 2 in greater detail.

Stream sender 220 and stream receiver 270 are shown in greater detail in FIG. 3. Stream sender 220 includes main stream logic 302, which constructs the stream of data to be sent to stream receiver 270. In this illustrative example, the subject stream transported from stream sender 220 to stream receiver 270 represents a video signal to be displayed by client device 110. Accordingly, main streaming logic 302 receives a video signal to send to client device 110 and constructs the subject stream to represent that video signal in a form accessible to client device 110, e.g., an MPEG-4 audiovisual data stream. Construction of an audiovisual data stream representing a video signal is known and is not described further herein.

Stream receiver 270 includes stream processing logic 322, which processes the subject stream to access the data represented therein. In this illustrative embodiment, stream processing logic 322 reconstructs the digitized video from the subject stream and decodes the digitized video to produce a video signal for display on input/output devices 258 (FIG. 2), e.g., on an LCD display of client device 110.

Stream sender 220 includes a connections controller 304 (FIG. 3), which opens, maintains, and closes TFRC connections between stream sender 220 and stream receiver 270. Similarly, stream receiver 270 includes a connections controller 324, which opens, maintains, and closes TFRC connections between stream sender 220 and stream receiver 270. Connections controller 304 initiates opening and closing of a particular TFRC connection with connections controller 324, and connections controller 324 responds and cooperates with the opening and closing of the particular TFRC connection. The opening, closing, and maintenance of TFRC connections is known and conventional and is not described further herein. As shown in FIG. 3, one or more TFRC connections can exist between connections controllers 304 and 324. The broken arrows represent additional TFRC connections that can be used.

Stream sender 220 includes an RTT meter 306 and a clock 308. RTT meter 306 measures round trip times of packets sent through connection controller 304 to connections controller 324 and responses sent by connections controller 324 to RTT meter 306. Specifically and in accordance with TFRC connections, packets of the subject stream include timestamps and a unique identifier, e.g., a sequence number, of the packet. Connections controller 304 receives data representing a current time from clock 308.

Connections controller 324 responds to a TFRC packet by sending a report packet with the timestamp and the unique packet identifier to RTT meter 306.

In response to receipt of such a report packet from connections controller 324, RTT meter 306 compares the time represented in the return packet to the current time as represented in data received from clock 308 to derive an amount of time elapsing between the inclusion of the timestamp within the packet of the subject stream by connections controller 304 and the receipt of the report packet by RTT meter 306. This amount of elapsing time is sometimes referred to as the "round trip time" of the packet. Each time a round trip time is measured by RTT meter 306, RTT meter 306 forwards the measured round trip time to connections controller 304.

It should be noted that an alternative to using round trip time to detect a substantial degradation of performance representing network congestion, one-way travel time of packets can also be used. Such would require synchronization of clock 308 and an analogous clock of stream receiver 270 such that connections controller 324 can measure the one-way travel time. In addition, connections controller 324 includes data represent the observed one-way travel time of each packet in the report packets sent to RTT meter 306 in this alternative embodiment. Synchronization of remotely located computer clocks is known and conventional and not described herein. In the processing described below in conjunction with logic flow diagram 400 (FIG. 4), one-way travel time can be directly substituted for round trip time in this alternative embodiment.

Connections controller 304 increases and decreases the number of TFRC connections between connections controllers 304 and 324 according to the amount that measured round trip times of packets of the subject stream exceeds a minimum round trip time between connections controllers 304 and 324. In particular, measured round trip times which are relatively close to the minimum round trip time suggest that the subject stream is not limited by congestion in Internet 102 or wireless network 104 and that additional connections could be opened to more fully utilize available bandwidth through wireless network 104. It is presumed that wireless network 104 provides less available bandwidth than does Internet 102. However, this assumption is not critical to the proper functioning of the implementation described herein and full bandwidth utilization can be achieved if Internet 102 provides less available bandwidth than does wireless network 104. This and other assumptions are described more completely below.

Eventually, connections controller 304 opens one or more additional TFRC connections between connections controllers 304 and 324 until the measured round trip times exceed the minimum round trip time by more than the threshold permissible amount. This indicates that packets through wireless network 104 are delayed due to congestion and that available bandwidth through wireless network 104 is fully utilized. To avoid loss of packets due to such congestion, connections controller 304 reduces the number of connections between connections controllers 304 and 324. The amounts by which subsequent measured round trip times exceed the minimum round trip time should then be within the threshold permissible amount and, at some subsequent time, connections controller 304 will again try a higher number of connections to again test for congestion through wireless network 104. In this way, the data rate of the subject stream tends to converge just below the amount of available bandwidth between host computer 106 and receiving device 110 to fully utilize such bandwidth and continues to adapt to changes in the amount of available bandwidth.

Figure 4:
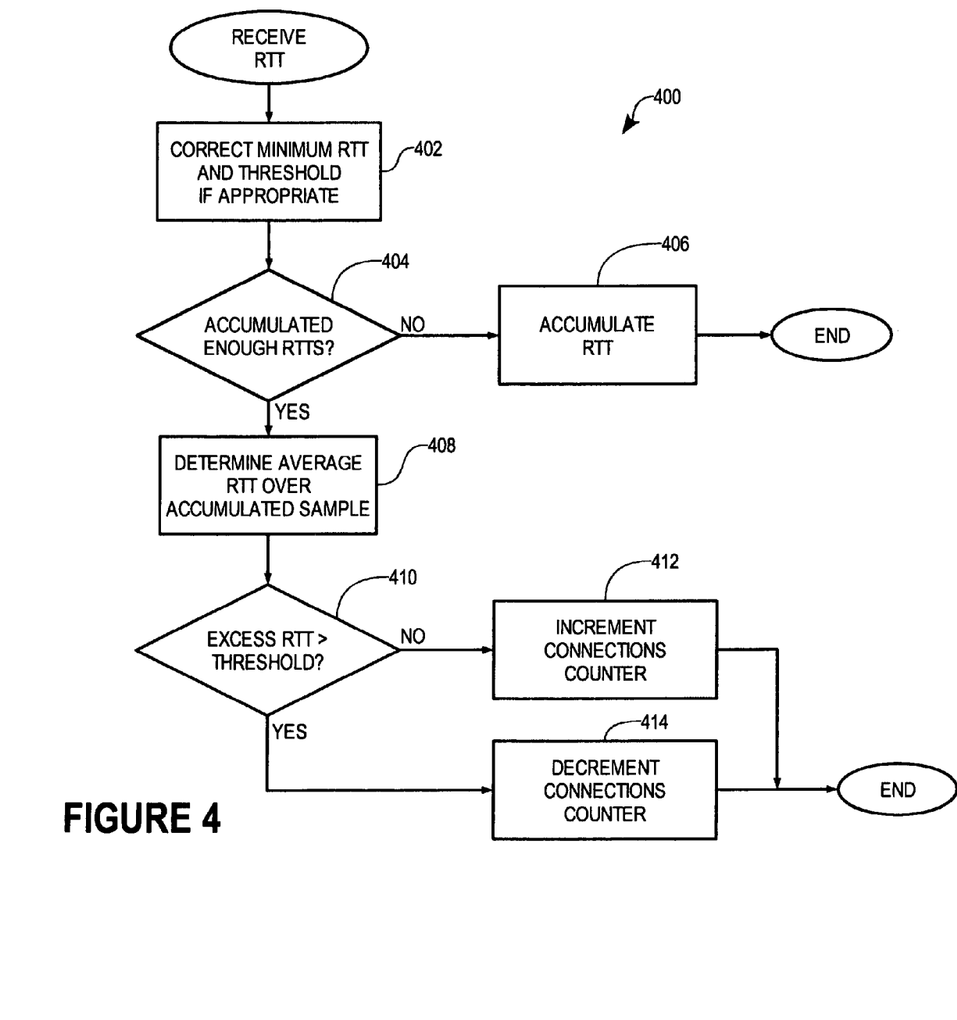
FIG. 4 is a logic flow diagram illustrating the adjustment of data rate by the stream sender of FIG. 3 in accordance with the present invention.

The processing of each measured round trip time received from RTT meter 306 by connections controller 304 is illustrated by logic flow diagram 400 (FIG. 4). Initially, a single TFRC connection is established and open between connections controllers 304 and 324.

In step 402, connections controller 304 makes any appropriate adjustments to the minimum round trip time and the threshold of permissible excess round trip time. Minimum round trip time from host computer 106 (FIG. 1), through nodes 108A-B of Internet 102, through wireless network 104, to client device 110 is quite difficult to determine from the particular topology of the networks through which the packets travel. Accordingly, the minimum round trip time is determined empirically.

Connections controller 304 compares the measured round trip time to the minimum round trip time and stores the measured round trip time as a new minimum round trip time if the measured round trip time is less than the prior minimum round trip time. Initially, the minimum round trip time is an artificially high number such that the first measured round trip time will most certainly be less and will be set as the minimum round trip time. The threshold of permissible excess round trip time is set in step 402 to be a predetermined proportion of the minimum round trip time, e.g., 20% in this illustrative embodiment.

In test step 404, connections controller 304 determines whether a sufficient number of round trip times have been accumulated to consider adjustment of the number of TFRC connections. Initially, connections controller 304 has accumulated no round trip times and so processing transfers from test step to step 406. In step 406, connections controller 304 accumulates the measured round trip time into an accumulated round trip time and thereafter processing according to logic flow diagram 400 completes.

Eventually, in processing each measured round trip time according to logic flow diagram 400, connections controller 304 accumulates at least a predetermined number of round trip times and processing transfers from test step 404 to step 408. In this illustrative embodiment, the predetermined number of round trip times is fifty (50). In an alternative embodiment, a predetermined amount of time, e.g., 20 seconds, is the threshold that determines whether a sufficient number of round trip times have been accumulated, rather than a predetermined number of round trip times.

In step 408, connections controller 304 determines an average round trip time of those accumulated, e.g., by dividing the accumulated round trip time by the predetermined number of round trip times. In addition, connections controller 304 clears the accumulated round trip time and the number of accumulated round trip times such that accumulation can begin anew in the next performance of step 406 by connections controller 304.

In test step 410, connections controller 304 determines an amount of time by which the average round trip time exceeds the minimum round trip time and compares that amount to the threshold of permissible excess round trip time. If that amount is no more than the threshold of permissible excess round trip time, processing transfers to step 412.

In step 412, connections controller 304 increases a connections counter for the subject stream and sets the actual number of connections accordingly. In this illustrative embodiment, connections controller 304 inversely increases the connections counter, i.e., increases the connections counter by an amount that is inversely proportion to the connections counter. The following equation represents such inversely increasing of the connections counter:

$$n = n + \frac{\alpha}{n} \quad (1)$$

In equation (1), n represents the connections counter for the subject stream as determined by connections controller 304, and α represents a constant and has a value of 1.0 in this illustrative embodiment. The connections counter is a floating point value and can be non-integer. Connections controller 304 sets the actual number of connections to be only the integer portion of the connections counter, using a floor operation for example. If the actual number of connects increases (i.e., if the connections counter increases in such a manner that the integer portion thereof increases), connections controller 304 opens one or more connections between connections controllers 304 and 324 such that the actual number of connections accurately represents the number of connections between connections controllers 304 and 324. Such increases the amount of bandwidth used by the subject stream and may cause network congestion if the data rate of the subject stream now exceeds the available bandwidth through wireless network 104. As long as the amount by which the average round trip time exceeds the minimum round trip time remains within the threshold of permissible excess round trip time, the connections counter increases quickly at first, e.g., while the number of actual connections is low, and increases more slowly as more connections are opened. When open connections are few in number, connections controller 304 opens additional connections more quickly than when the number of open connections is greater due to the inversely increasing of connection numbers.

Returning to test step 410, if the amount of time by which the average round trip time exceeds the minimum round trip time is greater than the threshold of permissible excess round trip time, processing transfers to step 414. In step 414, connections controller 304 decreases the connections counter for the subject stream and sets the actual number of connections accordingly. In this illustrative embodiment, connections controller 304 additively decreases the connections counter, i.e., decreases the connections counter by an amount that is independent of the connections counter. The following equation represents such additively decreasing of the connections counter:

$$n = n - \beta \quad (2)$$

In equation (2), n represents the connections counter for the subject stream as determined by connections controller 304, and β represents a constant and has a value of 1.0 in this illustrative embodiment. Connections controller 304 sets the actual number of connections to be only the integer portion of the connections counter, using a floor operation for example. Connections controller 304 does not permit the actual number of connections to decrease below a value of one (1). If the actual number of connections decreases (and it will in all cases of step 414 if β has a value of at least 1.0 and n has a value of at least 2.0 prior to the decrease), connections controller 304 closes one connection between connections controllers 304 and 324 to reduce the amount of bandwidth used by the subject stream. In this way, when the amount by which the average round trip time exceeds the minimum round trip time exceeds the threshold of permissible excess round trip time, the connections counter decreases immediately to avoid excessive network congestion between host computer 106 and client device 110 to thereby avoid substantial packet loss.

After either step 412 or step 414, processing according to logic flow diagram 400 completes.

It should be noted that, with multiple TFRC connections sending packets to connections controller 324, it is possible that packets will arrive at connections controller 324 out of sequence. Accordingly, connections controller 324 buffers and interjoins packets from the multiple connections into a single sequence of packets for stream processing logic 322.

The overall behavior represented by logic flow diagram 400 can be summarized as follows. Connections controller 304 periodically opens an additional connection to connections controller 324 and then collects a sampling of round trip times. If the sampling of round trip times represent a significant increase in round trip times, connections controller 304 interprets that increase as an indicator that available bandwidth has been exceeded and immediately closes at least one connection. Conversely, if the sampling of round trip times does not represent a significant increase in round trip times, wireless network 104 can properly handle all of the connections between connections controllers 304 and 324 and the boldness of connections controller 304 in opening yet another connection increases slightly. The increasing boldness accumulates for some period of time until another connection is opened by connections controller 304 and another sampling of round trip times is collected. This cycle repeats and keeps the number of TFRC connections between connections controllers 304 and 324 at near optimum to thereby maximize throughput between host computer 106 and client device 110.

The use of round trip times provides the advantage of naturally filtering out packets lost at the physical layer in wireless network 104. Detecting packet loss is insufficient since packet loss can be due to either network congestion or network errors at the physical layer. However, round trip times can only be measured for those packets which are successfully delivered to connections controller 324 and for which a return packet successful reaches RTT meter 306. Thus, excessive round trip times are a good indicator of network congestion that is relatively uninfluenced by network errors at the physical layer.

There are a number of assumptions underlying the system described above. These assumptions are believed to have a reasonable basis in fact in most currently used networks which include wired and wireless channels.

First, good short term performance is assured by use of TFRC connections and the primary objective of the system described above is ensuring good long term performance. It should be noted that connections other than TFRC connections can be used so long as those connections provide adequate protection from network instability, e.g., due to congestion collapse, and are fair to other TCP flows through Internet 102 and wireless network 104.

Second, packet sizes are the same for all TFRC connections. Third, one TFRC connection does not fully utilize available bandwidth through wireless network 104, i.e., that improved performance is possible. And, fourth, the return path from connections controller 324 to RTT meter 306 is assumed to be congestion-free and error-free for simplicity.

As described above, connections controller 304 leverages from short term quality control provided by TFRC connections and controls the data rate of the subject stream by varying the number of TFRC connections used to transport the subject stream to client device 110. In addition, a relation between observed round trip times and minimum round trip times indicates whether the subject stream exceeds bandwidth available through wireless network 104.

Figure 5:
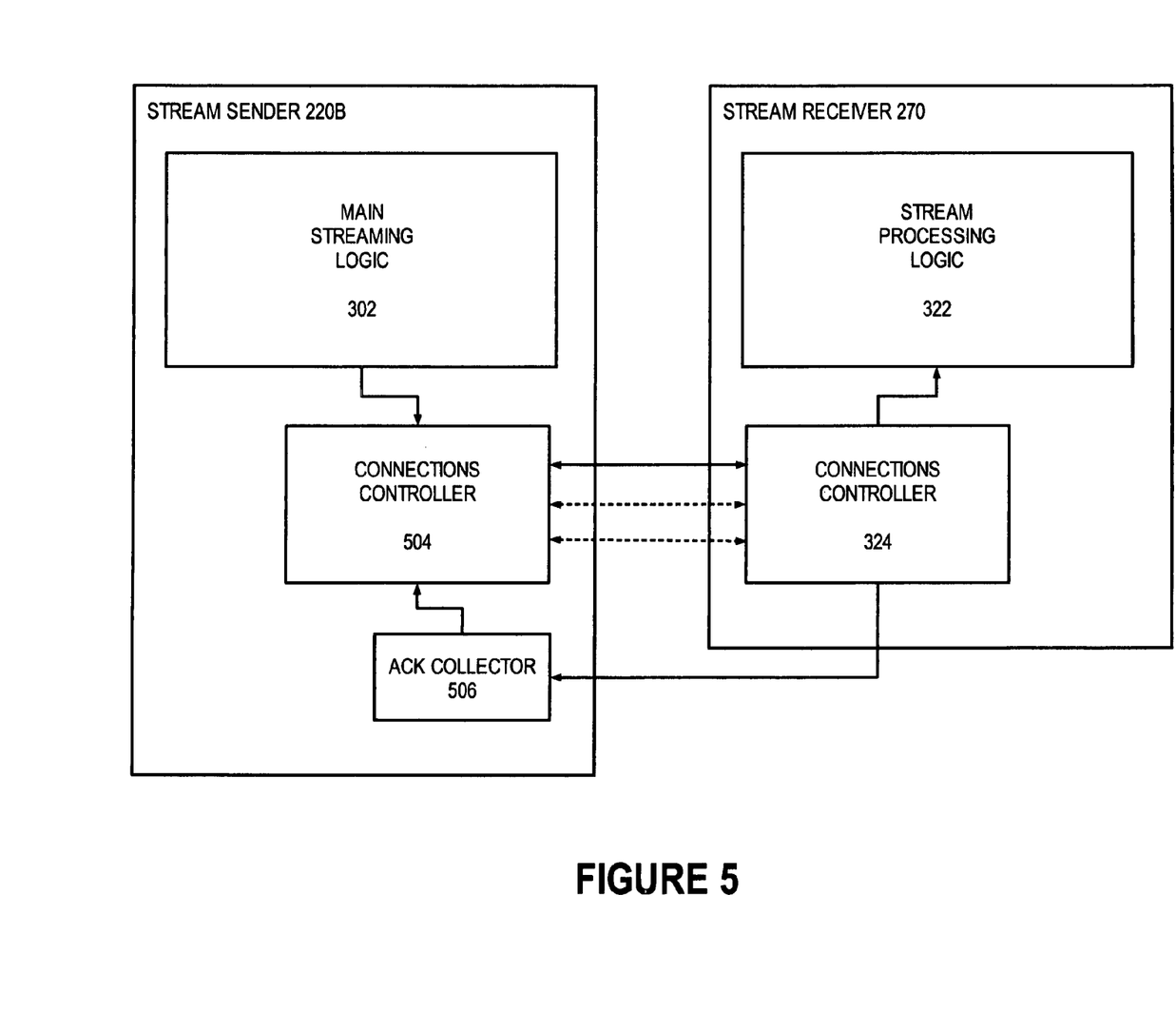
FIG. 5 is a block diagram of a stream sender of the host computer and a stream receiver of the receiving device of FIG. 2 in greater detail and in accordance with an alternative embodiment.

In an alternative embodiment, rates of packet loss are used as an alternative metric for detecting congestion caused by the subject stream itself and, thus, a data rate which exceeds the available bandwidth through wireless network 104. A stream sender 220B in accordance with the alternative embodiment is shown in FIG. 5. Main streaming logic 302 remains unchanged from that shown in FIG. 3. Connections controller 504 (FIG. 5) differs from connections controller 304 (FIG. 3) in a manner described below. RTT meter 306 (FIG. 3) is replaced with an ACK (acknowledgment packet) collector 506. Stream receiver 270 remains unchanged in this alternative embodiment.

Figure 6:
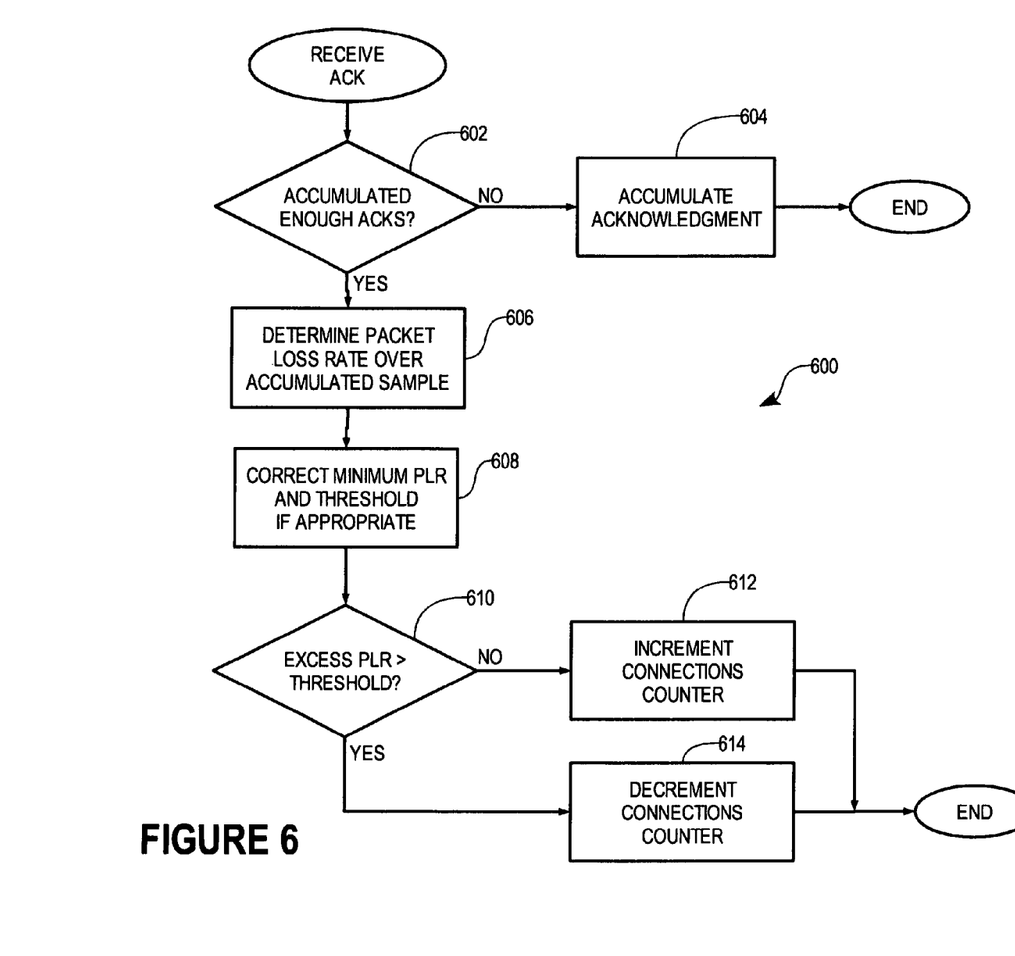
FIG. 6 is a logic flow diagram illustrating the adjustment of data rate by the stream sender of FIG. 5 in accordance with the present invention.

ACK collector 506 receives the return packets from connections controller 324 and notifies connections controller 504 of their receipt. Processing by connections controller 504 in response to receipt of ACK notifications is illustrated in logic flow diagram 600 (FIG. 6).

In step 602, connections controller 504 determines if a sufficiently large sample of packet acknowledgments have been received from ACK collector 506. If not, the received acknowledgment is accumulated in step 604. Such accumulation include a simple counting of acknowledgments in this embodiment. In this embodiment, a sufficiently large sample includes fifty (50) collected acknowledgments. In an alternative embodiment, a predetermined amount of time, e.g., 20 seconds, is the threshold that determines whether a sufficient number of acknowledgments have been accumulated, rather than a predetermined number of acknowledgments.

Conversely, if a sufficiently large sample of acknowledgments have been accumulated, processing transfers to step 606 in which connections controller 504 determines a packet loss rate for the accumulated sample. Report packets returned to ACK collector 506 by connections controller in accordance with TFRC include packet loss rates. In one embodiment, the packet loss rate for the accumulated sample is an average of all packet loss rates for all accumulated report packets. In an alternative embodiment, the packet loss rate for the accumulated sample is a sum of all packet loss rates for all accumulated report packets.

In step 608, connections controller 504 adjusts the minimum packet loss rate if necessary, i.e., if the observed packet loss rate is less than the previous minimum packet loss rate. Initially, the minimum packet loss rate is set to a relative high value such that the first observed packet loss rate is likely to be established as an early minimum packet loss rate. Over time, the minimum packet loss rate decreases as lower packet loss rates are observed. In other words, the minimum packet loss rate represents the lowest packet loss rate observed thus far for the subject stream. If the minimum packet loss rate is adjusted in step 608, connections controller 504 also adjusts the threshold excess packet loss rate to be proportional to the newly adjusted minimum packet loss rate, e.g., 20% of the new minimum packet loss rate. While an effective metric in detecting network congestion, packet loss rate is more subject to variance and more difficult to measure as accurately than is round trip time.

In test step 610, connections controller 504 determines whether the difference between the observed packet loss rate and the minimum packet loss rate is greater than the threshold excess packet loss rate. Under the assumptions described above, the packet loss rate due to cross traffic through Internet 102 is assumed to be constant and the packet loss rate due to network errors in wireless network 104 is assumed to be random and stationary. Accordingly, any significant change in the packet loss rate of the subject stream can be presumed to be caused by congestion of the subject stream itself, i.e., by a data rate of the subject stream which exceeds available bandwidth through wireless network 104.

If the difference between the observed packet loss rate and the minimum packet loss rate is no greater than the threshold excess packet loss rate, processing transfers to step 612 in which the connections counter is inversely increased in the manner described above with respect to step 412. Conversely, if the difference between the observed packet loss rate and the minimum packet loss rate is greater than the threshold excess packet loss rate, processing transfers to step 614 in which the connections counter is additively decreased in the manner described above with respect to step 414. After either step 612 or step 614, processing according to logic flow diagram 600 completes.

While adjusting a number of TFRC connections is described as a mechanism for controlling data rate of the subject stream, other mechanisms can be used as well. The data rate of a TFRC connection is represented by the following equation:

$$T = \frac{kS}{rtt\sqrt{P}} \qquad (3)$$

In equation (3), T represents the data rate of a single TFRC connection; k represents a constant which varies from about 0.7 to about 1.3 depending on the particular derivation of equation (3); S represents the size of packets of the subject stream; rtt represents the round trip time of packets of the subject stream; and p represents the packet loss rate between host computer 106 and client device 110. Equation (3) is known and is a simplification of the more complete and widely used equation below.

$$T = \frac{S}{rtt \times \sqrt{\frac{2 \times b \times p}{3}} + S_{RTO} \times \left(3 \times \sqrt{\frac{3 \times b \times p}{8}} \times p \times (1 + 32 \times p^2)\right)} \qquad (4)$$

In equation (4), b represents the number of packets acknowledged by a single TCP acknowledgment (e.g., 1); and $t_{RTO}$ represents the TCP retransmission time in seconds. In this illustrative embodiment, $t_{RTO}$ is set to the average round trip time plus four times the variance of the round trip time.

Beyond adding and removing TFRC connections to increase or decrease, respectively, the data rate of the subject stream, connections controller 304 can adjust the data rate by adjusting the packet size, S, for a single TFRC connection. For example, connections controller 304 can increase the data rate of the subject stream in step 412 by increasing the size of packets in the subject stream and can decrease the data rate of the subject stream in step 414 by decreasing the size of packets in the subject stream.

In the embodiments described above, equations (1) and (2) describe the adjustment of the data rate of the one or more TFRC connections in response to detected network congestion. In another embodiment, equation (1) is used to inversely increase the connections counter and the following equation is used instead of equation (2) to multiplicatively decrease the connections counter.

$$n = \beta n - \frac{n}{\alpha} \quad (5)$$

In this alternative embodiment, the constants α and β are constrained as follows: 0<α=(1-β)<1, and α=¼ and β=¾. As described above with respect to equation (2), connections controller 304 does not permit the connections counter to decrease below a value of 1.0 in application of equation (5). Accordingly, connections controller 304 never sends data at a rate of less than one normal TFRC connection.

In yet another embodiment, transmission rate controller 704 (FIG. 7) maintains only a single application layer data communication connection to a data receiver 724 but adjusts the data rate of the subject stream within the single data communication connection. However, transmission rate controller 704 does not modify the size of packets of the connection but instead sends more data packets than would a single TFRC connection. Transmission rate controller 704 is a part of stream sender 220C which represents an embodiment which is another alternative to stream sender 220 (FIG. 3). In addition, stream receiver 270C (FIG. 7) is an alternative to stream receiver 270 (FIG. 3).

In effect, the data stream is not particularly friendly to TCP connections and is therefore not a TFRC. Instead, the data stream avoids network congestion in the manner described above with respect to logic flow diagram 400 (FIG. 4), except that data rate is not controlled by using multiple TFRC connections but instead directly controlling data sending rates. It has been determined empirically that a connection of the type described in conjunction with FIG. 7, e.g., connection 730, competes with other TCP connections more aggressively than do other TCP connections but still allows TCP connections reasonable performance. Accordingly, a connection of the type of connection 730 is sometimes referred to herein as a TCP-tolerant rate control (TFRC) connection.

Figure 7:
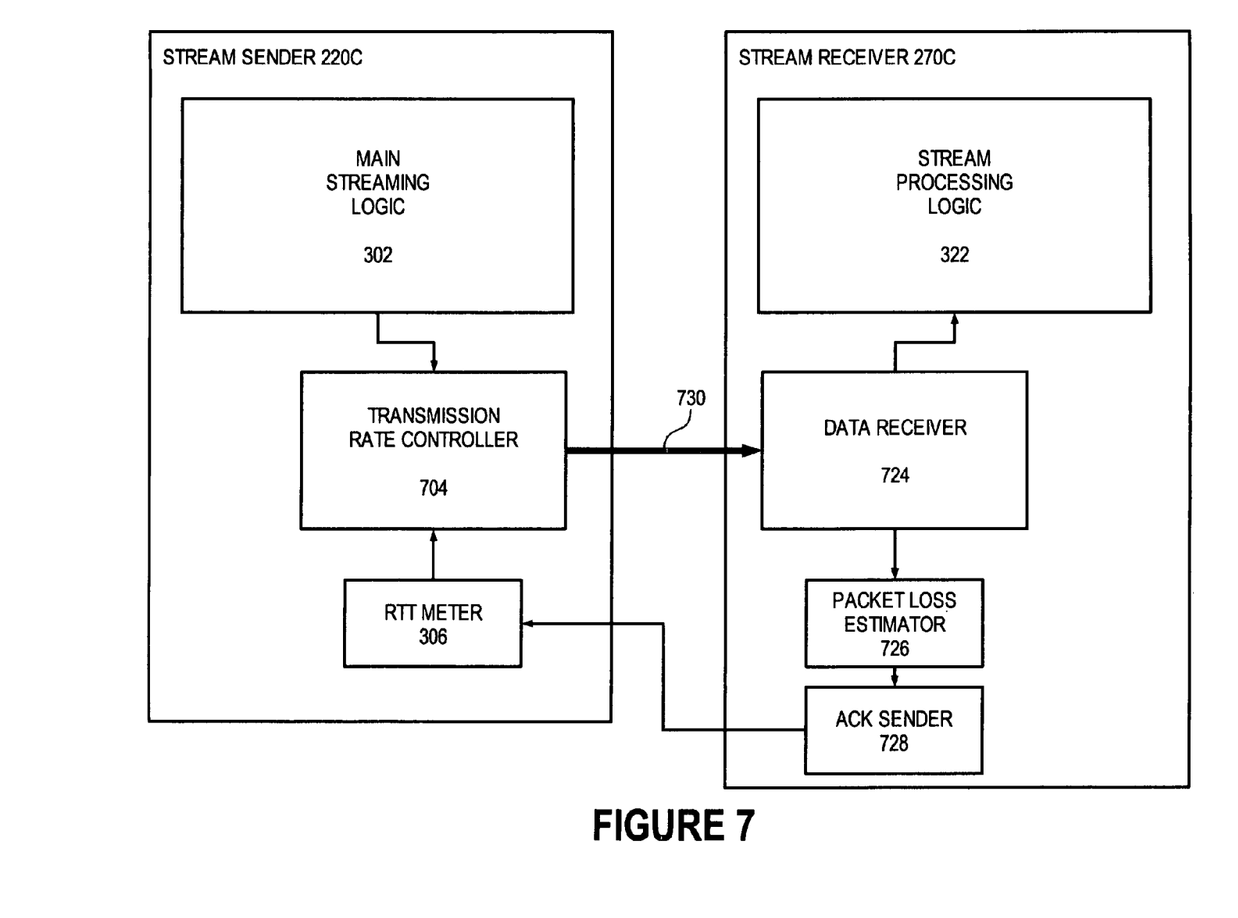
FIG. 7 is a block diagram of a stream sender of the host computer and a stream receiver of the receiving device of FIG. 2 in greater detail and in accordance with another alternative embodiment.

Connection 730 is managed in generally the same way that TFRC connections are managed, including normal rate determination, packet loss estimation, packet form, etc., except as otherwise noted herein. As described more completely below, packet loss estimation by a packet loss estimator 726 considers only a subset of all packets received by a data receiver 724 but is otherwise consistent with packet loss estimation by a TFRC data receiver/packet loss estimator. Packet loss estimator 726 sends the estimated packet loss rate to ACK sender 728 for subsequent transmission to RTT meter 306.

Ordinarily, in accordance with TFRC, transmission rate controller 704 and RTT meter 306 cooperate to send packets at a rate specified by equation (3) or equation (4) above in accordance with the round trip times and packet loss rates received by RTT meter 306 in report packets from ACK sender 728 transmission rate controller 704 times sending of data packets to effect the data rate represented by equation (3). This self-restraint exercised by transmission rate controller 704 is the way in which TFRC avoids network failure due to congestion collapse and allows sufficient resources for other TCP connections to transport data at reasonable rates. However, violation of this self-imposed constraint does not interfere with the proper transportation of data from host computer 106 to client device 110.

In this embodiment, the transmission rate of the TCP connection is proportional to the connections counter as described above with respect to logic flow diagrams 400 (FIG. 4) and 600 (FIG. 6). In particular, transmission rate controller 704 determines the proper TFRC data rate according to equation (4) above and proceeds to send data at n times that rate, where n is value represented by the connections counter and can be a non-integer as described above. Such a TFRC connection has a higher-than-TFRC data rate. A TFRC connection provides the advantage of finer granularity in adjusting the data rate of the subject stream as opposed to using an integer number of TFRC connections. Consider an example in which the available bandwidth from host computer 106 to client device 110 is 1.9 times the data rate of a single TFRC connection. Using an integer number of such TFRC connections results in transmitting data at 1.0 times that data rate and bursts of transmitting 2.0 times that data rate to approximate 1.9 times. In this embodiment, transmission rate controller 704 sends a single TFRC connection at 1.9 times the normal TFRC data rate.

Simply increasing the number of packets without more can cause packet loss estimator 726 to underestimate the packet loss rate. According to TFRC, packet loss estimator 726 records the beginning of a loss event when a packet loss is detected. The loss event ends when, after a period of one round trip time, another packet loss is detected. A loss event interval is defined as the difference in sequence numbers between these two lost packets. In accordance with TFRC, packet loss estimator 726 estimates the packet loss rate by taking the inverse of this difference in sequence numbers. If packet loss estimator 726 uses all the packets in the subject stream at the inflated data rate to estimate loss event rate, packet loss estimator 726 tends to underestimate the packet loss rate since the number of packets received by data receiver 724 is n times that of one TFRC connection. This underestimation by packet loss estimator 726 leads to inaccurate calculations of appropriate data rates in accordance with equations (3) and (4) and perhaps instability.

Accordingly, for packet loss rate estimation, packet loss estimator 726 only considers some of the packets of the subject stream, specifically a number of packets representing a single virtualized TFRC connection with a normal TFRC data rate. The packets to consider in packet loss rate estimation are marked by transmission rate controller 704. Transmission rate controller 704 interleaves marked and unmarked packets such that the marked packets of the subject stream emulate a single TFRC connection of the appropriate data rate.

To interleave these packets, transmission rate controller 704 adjusts the connections counter in the manner described above with respect to equations (1) and (2), or alternatively in the manner described above with respect to equations (1) and (5). The ratio of marked packets to all packets of the subject stream is approximately 1/n where n represents the connections counter. Accordingly, the ratio of unmarked packets to all packets is approximately 1-1/n transmission rate controller 704 determines the TCP friendly data rate using equation (3) above and sends packets representing a data rate of n times that amount, e.g., nT, where T is the data rate of equation (3) and n is the connections counter. In sending the subject stream, transmission rate controller 704 marks approximately 1/n of the packets and leaves the remainder unmarked. This marking can be the storage of any predetermined data code in the header so long as data receiver 724 is configured to recognize the code and only consider marked packets in estimating packet loss rate. For example, if the connections counter has a value of 1.5, two-thirds of the packets of the subject stream are marked packets and the remaining one-third are not marked. If the connections counter has a value of 2.5, transmission rate controller 704 marks two-fifths (40%) of the packets of the subject stream and does not mark the remaining three-fifths (60%). Data receiver 724 receives the unmarked packets and processes them normally except that the unmarked packets are not used for packet loss rate estimation. Instead, data receiver 724 considers only marked packets in estimating packet loss rates.

To facilitate accurate packet loss rate estimation by packet loss estimator 726, it is preferred that the marked and unmarked packets are evenly distributed throughout the subject stream, such that the relative ratios are observed within even quite small numbers of packets. In the example in which 40% of the packets are marked packets, the series of packets follows this pattern in this embodiment: unmarked packet, marked packet, unmarked packet, marked packet, unmarked packet, unmarked packet, marked packet, unmarked packet, marked packet, unmarked packet, and so on.

In an alternative embodiment, marked and unmarked packets are randomly distributed throughout the subject stream. In particular, transmission rate controller 704 uses a random number generator-to decide, in a pseudo-random manner, whether a particular packet is marked or unmarked. The random number generator weights the probabilities such that the likelihood of marking a packet is 1/n and the likelihood of leaving a particular packet unmarked is 1-1/n where n is value represented by the connections counter. The packet loss rate estimation may vary to a greater degree than with even distribution, but the packet loss rate should be about the same in the long term.

The result is a data stream with n times the TFRC data rate yet with the same effective control based on round trip time and packet loss rate as used in equation (4). In other words, the connection from transmission rate controller 704 to data receiver 724 can fully utilize the available bandwidth between host computer 106 and client device 110 and still prevent network failure due to congestion collapse and still peacefully coexist with other TCP connections.

Since the TFRC connection has a higher data rate than does an ordinary TFRC connection, queuing delay through Internet 102 and wireless network 104 can vary more widely that would queuing delay for an ordinary TFRC connection. Accordingly, the threshold permissible excess average round trip time used in step 410 is 50% of the minimum round trip time in this embodiment. Similarly, the threshold permissible excess packet loss rate used in step 610 is 50% of the minimum packet loss rate in this embodiment.

The above description is illustrative only and is not limiting. Instead, the present is defined solely by the claims which follow and their full range of equivalents.

The invention claimed is:

1. A method, comprising:
    calculating a threshold according to a minimum packet loss rate for a plurality of packets in the data stream;
    accumulating acknowledgement notifications for the plurality of packets;
    calculating an observed packet loss rate in response to the acknowledgement notifications accumulated for the plurality of packets; and
    decreasing a data rate in response to a difference between the observed packet loss rate and the minimum packet loss rate exceeding the threshold, otherwise increasing the data rate.

2. The method of claim 1, further comprising:
    providing at least one marked packet in the data stream to be used in calculating the observed packet loss rate and at least one unmarked packet to be excluded from calculating the observed packet loss rate; and
    distributing the at least one marked packets within the data stream to approximate inter-packet timing of packets.

3. The method of claim 1, wherein decreasing a data rate comprises decreasing the data rate of at least one data communications connection between a sending device and a receiving device.

4. The method of claim 3 further comprising additively decreasing the data rate of the at least one data communications connection between the sending device and the receiving device.

5. The method of claim 3 further comprising multiplicatively decreasing the data rate of the at least one data communications connection between the sending device and the receiving device.

6. The method of claim 1, further comprising accumulating a predetermined number of the acknowledgement notifications.

7. The method of claim 1, further comprising accumulating the acknowledgement notifications over a predetermined period.

8. The method of claim 1, further comprising calculating an average observed packet loss rate in response to the acknowledgement notifications accumulated for the plurality of packets.

9. The method of claim 1, further comprising adjusting the minimum packet rate loss in response to the observed packet loss rate being less than a previous minimum packet loss rate.

10. An apparatus, comprising:
    means for calculating a threshold according to a minimum packet loss rate for a plurality of packets in the data stream;
    means for accumulating acknowledgement notifications for the plurality of packets;
    means for calculating an observed packet loss rate in response to the acknowledgement notifications accumulated for the plurality of packets; and
    means for decreasing a data rate in response to a difference between the observed packet loss rate and the minimum packet loss rate exceeding the threshold, otherwise increasing the data rate.

11. The apparatus of claim 10, further comprising:
    means for providing at least one marked packet in the data stream to be used in calculating the observed packet loss rate and at least one unmarked packet to be excluded from calculating the observed packet loss rate; and
    means for distributing the at least one marked packet within the data stream to approximate inter-packet timing of packets.

12. The apparatus of claim 10, further comprising means for decreasing the data rate of at least one data communications connection between a sending device and a receiving device.

13. The apparatus of claim 12, further comprising means for additively decreasing the data rate of the at least one data communications connection.

14. The apparatus of claim 12, further comprising means for multiplicatively decreasing the data rate of the at least one data communications connection.

15. The apparatus of claim 10, further comprising means for accumulating a predetermined number of the acknowledgement notifications.

16. The apparatus of claim 10, further comprising means for accumulating the acknowledgement notifications over a predetermined period.

17. The apparatus of claim 10, further comprising means for calculating an average observed packet loss rate in response to the acknowledgement notifications accumulated for the plurality of packets.

18. The apparatus of claim 10, further comprising means for adjusting the minimum packet rate loss in response to the observed packet loss rate being less than a previous minimum packet loss rate.

19. An apparatus, comprising:
a memory configured to store instructions;
a processor configured to execute the instructions stored in the memory to:
calculate a threshold according to a minimum packet loss rate for a plurality of packets in the data stream;
accumulate acknowledgement notifications for a plurality of packets;
calculate an observed packet loss rate in response to the acknowledgement notifications accumulated for the plurality of packets; and
decrease a data rate in response to a difference between the observed packet loss rate and the minimum packet loss rate exceeding the threshold, otherwise increase the data rate.

20. The apparatus of claim 19, wherein the processor is configured to execute the instructions stored in the memory further to:
provide at least one marked packet in the data stream to be used in calculating the observed packet loss rate and at least one unmarked packet to be excluded from calculating the observed packet loss rate; and
distribute the at least one marked packet within the data stream to approximate inter-packet timing of packets.

21. The apparatus of claim 19, wherein the processor is configured to execute the instructions stored in the memory further to additively decrease a data rate of at least one data communications connection.

22. The apparatus of claim 19, wherein the processor is configured to execute the instructions stored in the memory further to multiplicatively decrease a data rate of at least one data communications connection.

23. The apparatus of claim 19, wherein the processor is configured to execute the instructions stored in the memory further to accumulate a predetermined number of the acknowledgement notifications.

24. The apparatus of claim 19, wherein the processor is configured to execute the instructions stored in the memory further to accumulate the acknowledgement notifications over a predetermined period.

25. The apparatus of claim 19, wherein the processor is configured to execute the instructions stored in the memory further to calculate an average observed packet loss rate in response to the acknowledgement notifications accumulated for the plurality of packets.

26. The apparatus of claim 19, wherein the processor is configured to execute the instructions stored in the memory further to adjust the minimum packet rate loss in response to the observed packet loss rate being less than a previous minimum packet loss rate.

* * * * *

UNITED STATES PATENT AND TRADEMARK OFFICE
CERTIFICATE OF CORRECTION

| | | |
|---|---|---|
| PATENT NO. | : 8,379,535 B2 | Page 1 of 1 |
| APPLICATION NO. | : 12/881089 | |
| DATED | : February 19, 2013 | |
| INVENTOR(S) | : Chen et al. | |

It is certified that error appears in the above-identified patent and that said Letters Patent is hereby corrected as shown below:

On the Title Page, in Item (56), under "OTHER PUBLICATIONS", in Column 2, Line 1, delete "(TRFC)" and insert -- (TFRC) --, therefor.

On the Title Page, in Item (57), under "ABSTRACT", in Column 2, Line 1, delete "TRFC" and insert -- TFRC --, therefor.

In the Specification

In Column 4, Line 19, delete "TRFC" and insert -- TFRC --, therefor.

In Column 9, Line 48, delete "$n=n-\beta(2)$" and insert -- $n=n-\beta$            (2) --, therefor.

Signed and Sealed this
Twentieth Day of May, 2014

Michelle K. Lee
*Deputy Director of the United States Patent and Trademark Office*